Dec. 12, 1961  J. J. SHINKLE  3,012,706

BOX CARRYING AND CLOSING ARRANGEMENT

Filed April 28, 1958

INVENTOR:
JACKSON J. SHINKLE,
BY Kingsland, Rogers & Ezell
ATTORNEYS

3,012,706
BOX CARRYING AND CLOSING ARRANGEMENT
Jackson J. Shinkle, 1904 N. Geyer Road, St. Louis, Mo.
Filed Apr. 28, 1958, Ser. No. 731,223
1 Claim. (Cl. 229—50)

The present invention relates generally to carrying means for boxes which combines the function of maintaining a movable lid in place while the box is being carried thereby. More particularly, the present invention is concerned with a novel box carrying-closure arrangement in which a cord is permanently associated with the box to permit removal of the lid when the cord is in one position of movement and to both trap the lid and to provide a carrying reach when in the other position of movement.

Heretofore, many box carrying and closure arrangements have been devised which have found particular application to shoe boxes, hat boxes, small utility boxes, and the like. A few have found wide application, such as the arrangement employed with hat boxes. With most such arrangements, however, difficulties have been encountered in respect to practical application or in respect to costs involved in applying the arrangement to suitable boxes.

Therefore, an object of the present invention is to provide a novel box carrying and closure arrangement of simple form which is effective for the intended purposes when applied to boxes having movable lids, such as shoe boxes, and the like.

In brief, the present invention comprises a cord of predetermined length which is permanently attached to a box in a way to permit movement of the whole length thereof in predetermined manner. When the invention is incorporated in a shoe box, for example, in one exemplification of the invention, one end of the cord is secured as by a staple or brad to the outer surface of one end of the box near one upper corner, but below the edge of the lid. The other free end of the cord is similarly secured to the other end of the box in a directly opposed position. Prior to anchoring the second end, the cord is threaded through an eyelet staple secured to either end of the box at the other side from the end securing staple or brad and on a line therewith. The length of the cord is such as to permit it to be trained around one side of the box with enough sag for slipping up over the top thereof in a diagonal relationship, which will provide upon pulling on the cord between the eyelet staple and the adjacent staple a reach sufficient for a carrying handle, in effect.

Therefore, another object of the present invention is to provide a novel box carrying and closure arrangement which can be readily moved from inoperative position in relation to the box to carrying and closing relation, and back to inoperative position when it is desired to again open the box.

Another object is to provide a novel box carrying and closure arrangement which can be made at a rapid rate and which is relatively inexpensive.

Another object is to provide a novel box carrying and closure arrangement which is subject to a pleasing appearance.

Another object is to provide a novel box carrying and closure arrangement in which the cord element is located exteriorly of the box.

The foregoing and other objects and advantages are apparent from the following description taken with the accompanying drawing, in which.

Figure 1:
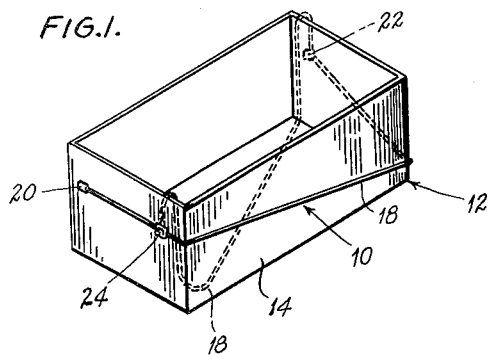
FIGURE 1 is an isometric view of the bottom part of a shoe box incorporating the present invention.
Figure 2:
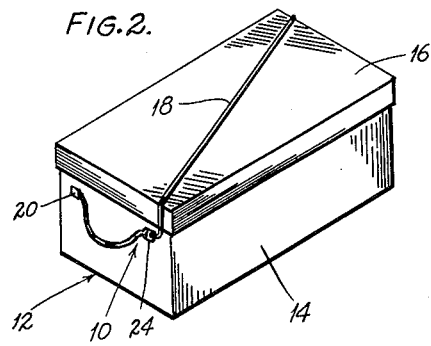
FIGURE 2 is an isometric view of the shoe box with top applied and the novel carrying and closure arrangement in operative relation thereto.
Figure 3:
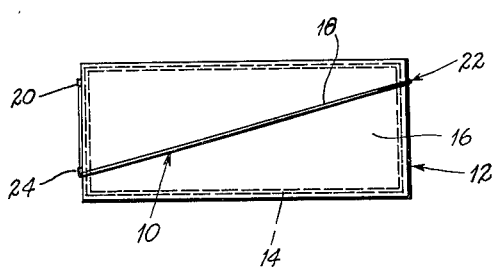
FIGURE 3 is a top plan view of the unit of FIGURE 2.
Figure 4:
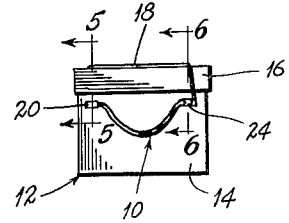
FIGURE 4 is an end view thereof.
Figure 5:
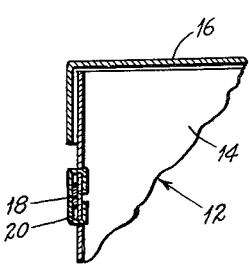
FIGURE 5 is an enlarged vertical cross-sectional view on substantially the line 5—5 of FIGURE 4.
Figure 6:
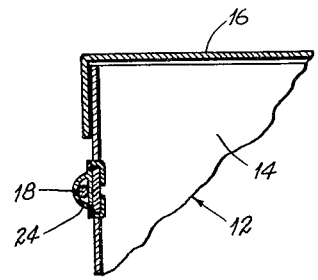
FIGURE 6 is an enlarged vertical cross-sectional view on substantially the line 6—6 of FIGURE 4.
Figure 7:
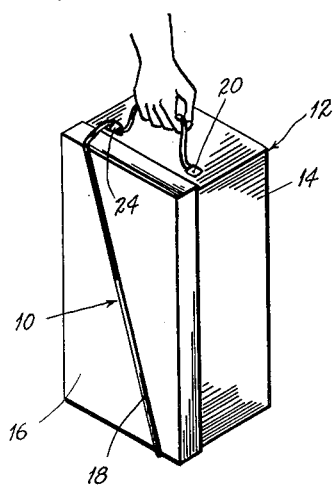
FIGURE 7 is an isometric view of the box and arrangement of FIGURE 2 in carry position.

Referring to the drawing more particularly by reference numerals and considering FIGURES 1–7, 10 indicates generally a novel box carrying and closure arrangement incorporating the teachings of the present invention. The arrangement 10 is applied to a shoe box 12 comprising a bottom part 14 and a top 16.

The arrangement 10 comprises a suitable cord 18, attaching staples 20 and 22, or the like, and an eyelet staple 24. The staples 20 and 22 firmly anchor the ends of the cord 18 to the outer surfaces of the ends of the box bottom part 14 in the directly opposed positions clearly shown in the drawing. The cord 18 is trained through the eyelet staple 24 prior to anchoring by the staples 20 and 22, the eyelet staple 24 being secured to the end of the box bottom part 14 in spaced relation to the staple 22, as illustrated. It will be noted that, with the cord 18 trained around the one side and two end portions of the bottom part, as shown in FIGURE 1, there is sufficient play in the portion thereof between the eyelet staple 24 and the staple 22 to permit such portion being moved upwardly over the top 16 into the position shown in FIGURE 2. The slack portion may be then drawn through the eyelet staple 24 to provide a handle portion between the eyelet staple 24 and the staple 20 for carrying the box 12 in the position shown in FIGURE 7.

The main portion of the cord 18 is disposed within the shoe box 12 to one side of shoes occupying the same, or therebeneath prior to sale of the shoes to a customer, as is indicated in dotted lines in FIGURE 1.

It is manifest that the novel arrangement 10 is exceedingly simple both in application to the shoe box 12 and in respect to use thereof. No skill is required to simply slide the cord over the top 16 and then pull the slack portion through the eyelet staple 24 to provide a carrying portion. Obviously, when in carrying position, the cord 18 firmly maintains the top 16 in place on the bottom part 14.

Figure 8:
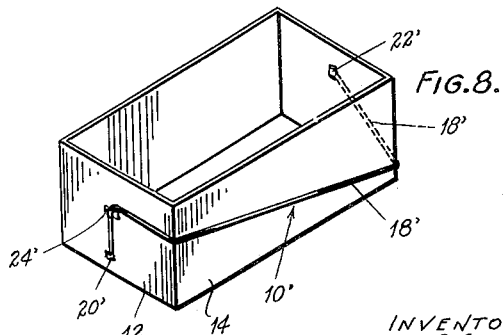
FIGURE 8 is a view similar to FIGURE 1, illustrating a modified carrying and closure arrangement.

In FIGURE 8 is shown a modification of the invention, an arrangement 10' including a cord 18' secured by staples 20' and 22' and threaded through an eyelet staple 24'. The eyelet staple 24' is disposed in opposed relation to the remote staple 22' with the staple 20' below the eyelet staple 24', as illustrated. The eyelet staple 24' and staple 20' can be moved to right or left as desired, as may the staple 22', to achieve a selected position of the handle portion and of the closure portion of the cord 18'.

The staples 20, 22 and 24 may take any desired form. For example, the eyelet staple 24 may be of U-shape to trap the cord 18 rather than to require threading, as shown in FIGURE 8.

It is clear that there has been provided a shoe box carrying and closure arrangement which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claim which follows.

What is claimed is:

In combination with a box having a closure top, a carrying and closing arrangement therefor, comprising said box, a segment of cord, means attaching the ends of said cord segment to opposite ends of the box against the outside faces thereof, and means dividing said cord segment into two selectively variable lengths to provide a box carrying length and a top closing length in one position of said cord, said dividing means comprising a staple secured to an end of said box spaced from the cord attaching means on the same end and having a portion trapping said cord against the exterior face of said box end and holding it against removal bodily outwardly from the box, but permitting free movement thereof to vary the lengths at each side of said staple, said cord segment being wholly on the outside of the box when in carry position, a reach of said cord being disposed in said box when not required for carrying and closing purposes and being of a maximum length to fit in tight frictional engagement around the outsides of the box between the staple and the cord attaching means on the opposite end of the box during box packing operations.

References Cited in the file of this patent

UNITED STATES PATENTS

| | | |
|---|---|---|
| Re. 12,941 | Lehmann | Apr. 13, 1909 |
| 744,138 | Walters | Nov. 17, 1903 |
| 1,117,298 | Zaar et al. | Nov. 17, 1914 |
| 1,927,706 | House | Sept. 19, 1933 |
| 2,260,951 | Mulnix | Oct. 28, 1941 |